Sept. 4, 1928.  
C. O. SWENSON  
1,682,863  
METHOD OF MAKING CORRUGATED FASTENERS  
Filed Oct. 9, 1924
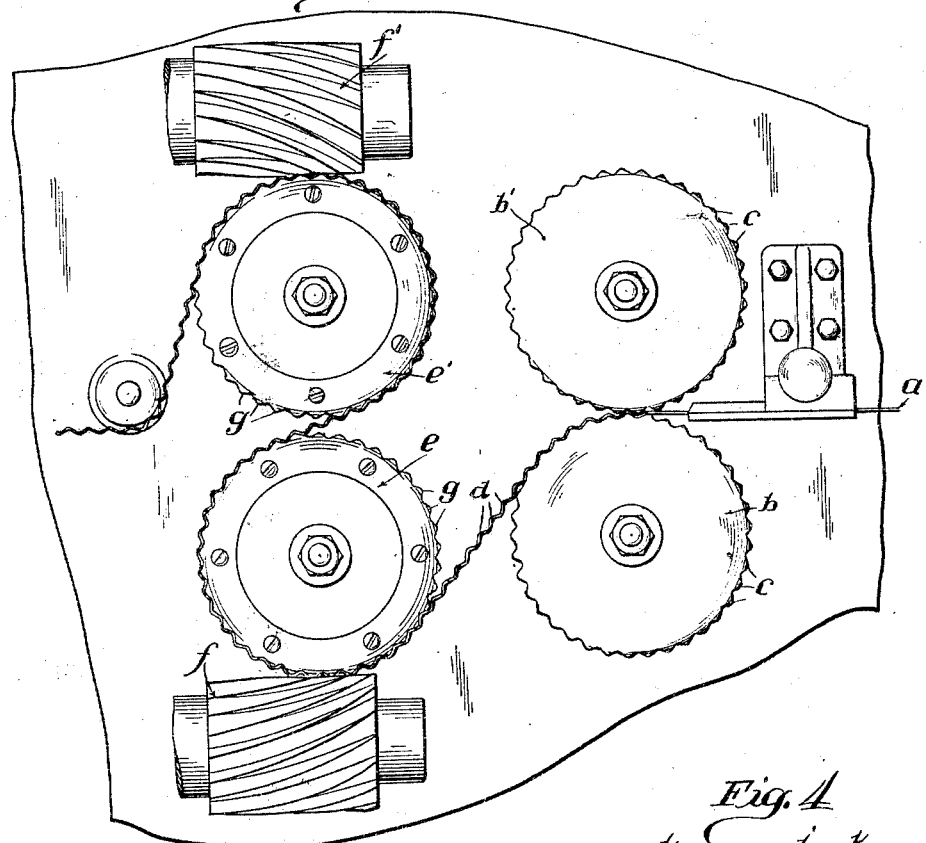
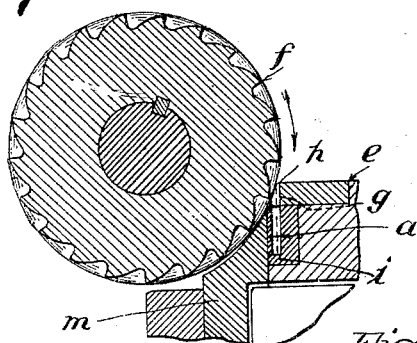
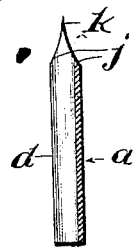
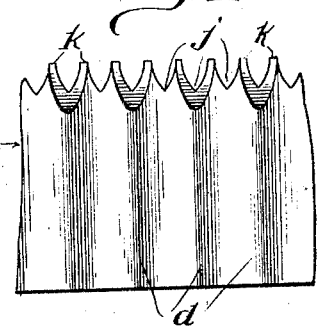
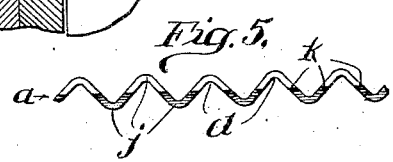
Inventor  
Carl O. Swenson  
Williams, Bradbury,  
McCaleb & Hinkle  
Attorneys Patented Sept. 4, 1928.

1,682,863

UNITED STATES PATENT OFFICE.

CARL O. SWENSON, OF CHICAGO, ILLINOIS, ASSIGNOR TO CONSOLIDATED STEEL STRAPPING COMPANY, OF CHICAGO, ILLINOIS, A CORPORATION OF DELAWARE.

METHOD OF MAKING CORRUGATED FASTENERS.

Application filed October 9, 1924. Serial No. 742,643.

My invention relates to the manufacture of corrugated saw tooth fasteners such as are used in the manufacture of door and window sashes, barrel ends, packing boxes, etc. Generally stated, my invention contemplates the provision of a method whereby the teeth of such a fastener may be provided by a milling operation which avoids the formation of burrs or uneven throats between the several teeth of the fastener.

Prior inventors who have been concerned with the manufacture of corrugated saw tooth fasteners apparently have regarded the aforesaid burrs or uneven throats as unavoidable results of attempting to form the saw teeth by a milling operation. The prior art is replete with ways and means for removing or operating upon the burrs or uneven throats after the milling operation has been completed, but nowhere in the prior art do we find any method whereby to mill saw teeth on a corrugated strip without leaving such burrs or uneven throats.

A preferred manner of carrying out this improved method is illustrated in the accompanying drawing in which:

Figure 1 is a plan view, more or less diagrammatic, showing the preferred arrangement of feed and backing wheels and milling cutters for practicing my method;

Figure 2 is a transverse sectional view, on a larger scale, of one of the cutters and its associated backing wheel; and Figures 3, 4 and 5 are different views of the finished strip.

In Figure 1 is shown the relative arrangement of all of the parts which operate upon the strip. This view corresponds to a diagrammatic plan view of a preferred design of machine for carrying out the present process, which machine I have made the subject-matter of my co-pending application Serial No. 742,642, filed October 9, 1924.

The strip designated $a$, is first fed to a pair of corrugating wheels $b$—$b'$. These wheels have teeth around their peripheries engaging in a loose mesh, between which teeth the strip $a$ is drawn. The teeth $c$ on these wheels are designed to produce the desired form of corrugation in the strip, represented by the corrugations $d$ in Figures 3, 4 and 5. These corrugating wheels are driven through driving mechanism described in detail in my above-mentioned co-pending application.

From the corrugating wheels the strip is guided over the first feeding and backing wheel $e$ where it is subjected to the action of a rotary milling cutter $f$. This milling cutter has its cutting face tangential to the backing wheel $e$ and the portion of strip $a$ guided by this wheel. The cutter is disposed in a plane adjacent the top of the strip as shown in Figure 2, so that its teeth make a sloping cut on one side of the strip, preferably from a substantially median plane of the strip downwardly through the corrugations which protrude from such side of the strip.

The teeth $g$ on the backing wheel $e$ substantially fill the corrugations which protrude towards the cutter. The upper edges of these teeth are chamfered back to clear the cutter teeth as indicated at $h$. As fully described in the above mentioned copending application, the backing wheel has an annular recess formed in its periphery for receiving a backing ring having a lower backing shoulder $i$ projecting therefrom. This shoulder backs up the lower edge of the strip against the down thrust imparted to the strip from the cutter. This backing ring is adapted for ready substitution by other rings having shoulders $i$ at different heights for accommodating different widths of strip. The teeth $g$ are preferably formed on a separate ring which is secured in an upper recess in the backing wheel in position to overlie the backing ring. An adjustable arcuate guide $m$ may be provided to embrace the outer side of the strip $a$ directly below the point of cutting.

From the wheel $e$ the strip is passed over to a wheel $e'$, which is similar in all material respects to the wheel $e$. Here the reverse side of the strip is subjected to a similar cutting action by a second milling cutter $f'$. This second milling cutter is likewise disposed in a plane substantially tangential to the periphery of the backing wheel $e'$ and the portion of the strip guided by this wheel.

It will be observed that during each of the foregoing milling operations the strip is being moved through a curved path past the cutter, which, as I shall presently describe, is an important factor in avoiding burrs and uneven throats. Another factor contributing to the smoothness and uniformity of cut is the disposal of the cutter on an axis which is substantially parallel with the plane of the strip edge upon which it operates.

Relative to the step of moving the strip through a curved path, it will be noted that the downward sweep of the cutter teeth exerts a force on the strip tending to move it from its normal path. This force may be resolved into two components, one acting edgewise of the strip and the other at right angles to the face of the strip. The edgewise component is, of course, resisted by the bottom disc $i$ under the backing wheel. The lateral component follows from the outward sweep of the cutter teeth away from the backing wheel. While each cutter tooth is cutting through the material in this part of its arc it tends to pull the strip away from the normal path, and if not resisted the resulting variation in the path of the strip will tend to cause burrs and uneven cutting. However, by moving the strip through a curved path—or presenting a bowed portion of the strip to the cutter—this lateral force component is resisted by the tensional strength of the side portions of the curve and by the locked engagement of the strip in the teeth of the backing wheel. This characteristic of the curved strip in resisting the lateral force component is of importance even where the arcuate guide $m$ is employed.

In being presented to the milling cutter the strip is solidly reenforced in the rear by the teeth of the backing wheel $e$. These teeth extend up into close proximity to the arc of the cutter teeth so that the strip is supported up to the point of cutting, from which point the teeth are sloped back as above described. A particular advantage accrues to the practice of having each corrugation which protrudes toward the cutter substantially filled with a tooth $g$. This tooth locks the corrugation against the tendency to flatten or spread under the lateral pressure of the cutter teeth. Moreover the feed of the strip is thus through the positively engaging surfaces of the corrugation and of the backing tooth, instead of by endwise pulling of the strip past the cutter, which in itself tends to flatten the corrugations.

Another advantage inherent in presenting a bowed portion of the strip to the cutter is that because of the bowed contour the sweep of the cutter teeth will cut each throat $j$ down to more of a joint, approaching the form of a V bottom. This reduces the tendency for burrs or webs to remain at the bottoms of the throats, which is more pronounced where the bottom is more rounded.

By disposing the cutter on an axis which is substantially parallel with the plane of the strip edge upon which it operates, the cutting edges of the milling tool traverse a circular path which intercepts the strip edgewise. In their downward sweep the cutter teeth successively engage the strip at a point in or beyond the median plane of the edge thereof and leave or disengage the strip at one side and between the edges thereof. This disposal of the cutter produces a "hollow" cut in the strip, leaving sides of a slightly concave section. Such a cut results in sharper tooth points and assists in avoiding burrs and uneven throats. This disposal and direction of rotation of the cutter also results in the cutter teeth completing their shearing operation or breaking contact with the strip down below the bottoms of the throats along the side of the strip, which also aids in avoiding burrs or other unevenness in the throats $j$ or at the points $k$.

The finished product is illustrated in Figures 3, 4 and 5. It will be noted that the throats $j$ are relatively sharp in form, as above stated, and relatively free of any burrs or jagged edges. This also applies to the tooth points $k$. By virtue of this absence of burrs and other irregularities I do not need to subject the strip constructed in accordance with my invention to the action of clearing dies or any other mechanism for clearing up the strip and placing it in finished form.

Having thus described my invention, what I claim, is:

The herein described method of milling saw teeth in a corrugated fastener strip, which consists in bowing the strip, in moving the strip while bowed with its edge into cutting relation with a milling cutter, and in subsequently bowing the strip in the opposite direction and in moving its edge again into cutting relation with a milling cutter.

In witness whereof, I hereunto subscribe my name this 17th day of September, 1924.

CARL O. SWENSON.